(12) United States Patent
Takasu et al.

(10) Patent No.: US 11,843,728 B2
(45) Date of Patent: Dec. 12, 2023

(54) IMAGE FORMING DEVICE CONVERTING IMAGE DATA TO RASTER IMAGE DATA USING DITHER MATRIX

(71) Applicant: BROTHER KOGYO KABUSHIKI KAISHA, Nagoya (JP)

(72) Inventors: Masaya Takasu, Tokai (JP); Junichi Yokoi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/818,564

(22) Filed: Aug. 9, 2022

(65) Prior Publication Data

US 2023/0063451 A1    Mar. 2, 2023

(30) Foreign Application Priority Data

Aug. 27, 2021    (JP) .................................. 2021-139059

(51) Int. Cl.
*G03G 15/043* (2006.01)
*H04N 1/00* (2006.01)
*G06K 15/02* (2006.01)

(52) U.S. Cl.
CPC ........... *H04N 1/00* (2013.01); *G06K 15/1876* (2013.01); *G06K 15/1878* (2013.01); *G03G 15/043* (2013.01)

(58) Field of Classification Search
CPC ... H04N 1/00; G06K 15/1876; G06K 15/1878
USPC ....................................................... 358/3.13
See application file for complete search history.

(56) References Cited

U.S. PATENT DOCUMENTS

| 8,559,083 | B2 * | 10/2013 | Kato | ..................... | H04N 1/4055 |
| | | | | | 358/1.9 |
| 8,873,101 | B2 * | 10/2014 | Tamura | ................ | G03G 15/043 |
| | | | | | 358/1.3 |
| 2007/0035773 | A1 * | 2/2007 | Oki | ......................... | H04N 1/405 |
| | | | | | 358/3.06 |

(Continued)

FOREIGN PATENT DOCUMENTS

| JP | 2007-082011 A | 3/2007 |
| JP | 2007-156394 A | 6/2007 |
| JP | 2009-077340 A | 4/2009 |

*Primary Examiner* — Allen H Nguyen
(74) *Attorney, Agent, or Firm* — Merchant & Gould P.C.

(57) ABSTRACT

In an image forming device, a controller converts continuous-tone image data to raster image data using a dither matrix. The continuous-tone image data includes pixels each has a tone value. The raster image data is binary image data corresponding to exposure areas. The dither matrix includes threshold values. The dither matrix is configured so that as an exposure area percentage of the raster image data increases, growth of the exposure area progresses according to a growth process including: a stage at which an exposure area extends in a predetermined screen direction from an isolated exposure area to connect with another isolated exposure area; and a stage at which after the isolated exposure area connects with another isolated exposure area, the exposure area extends in a crossing direction crossing the predetermined screen direction. The controller controls the exposure device to expose the photosensitive drum based on the raster image data.

13 Claims, 8 Drawing Sheets

(56) References Cited

U.S. PATENT DOCUMENTS

2007/0103730 A1    5/2007  Yasutomi
2008/0123146 A1*   5/2008  Ike ..................... H04N 1/4051
                                                      358/3.13

* cited by examiner

CASE OF DITHERING
WITH LARGE ANGLE (75 degrees)

BEAM RADIUS ELONGATED
IN X-DIRECTION

EXPOSURE INTERFERENCE
OCCURS
(BLACK STREAKS ARE GENERATED)

FIG. 5B

CASE OF DITHERING
WITH LARGE ANGLE (75 degrees)

BEAM RADIUS ELONGATED
IN Y-DIRECTION

EXPOSURE INTERFERENCE
DOES NOT OCCUR

FIG. 5C

CASE OF DITHERING
WITH SMALL ANGLE (15 degrees)

BEAM RADIUS ELONGATED
IN X-DIRECTION

EXPOSURE INTERFERENCE
DOES NOT OCCUR

FIG. 5D

CASE OF DITHERING
WITH SMALL ANGLE (15 degrees)

BEAM RADIUS ELONGATED
IN Y-DIRECTION

EXPOSURE INTERFERENCE
OCCURS
(BLACK STREAKS ARE GENERATED)

FIG. 6A

← GROWTH ORDER SHOWN IN DITHER MATRIX

FIG. 6B  GROWTH OF DITHER MATRIX

SUB SCANNING DIRECTION 1 (DITHER MATRIX HAVING BASIC DITHER PATTERNS)

2

3

4 (LINE SCREEN IS FORMED)

5

6 NEXT GROWING DIRECTION

7

8 EXPOSURE AREA PERCENTAGE = 60%

← GROWTH ORDER SHOWN IN DITHER MATRIX

FIG. 8B  GROWTH OF DITHER MATRIX

1 (DITHER MATRIX HAVING BASIC DITHER PATTERNS)

2 (* FOR SUPPRESSING WHITE STREAKS)

3

4 (LINE SCREEN IS FORMED)

5

6 NEXT GROWING DIRECTION

7

8 EXPOSURE AREA PERCENTAGE = 60%

IMAGE FORMING DEVICE CONVERTING IMAGE DATA TO RASTER IMAGE DATA USING DITHER MATRIX

REFERENCE TO RELATED APPLICATIONS

This application claims priority from Japanese Patent Application No. 2021-139059 filed on Aug. 27, 2021. The entire content of the priority application is incorporated herein by reference.

BACKGROUND ART

Some conventional electrophotographic printers print halftone images using binary dither patterns. While there are many types of dither patterns, line screen type dither patterns employing patterns with predetermined screen angles are widely known.

The use of common line screen dither patterns in relation to an image forming device and method is known in the art. This conventional image forming device and method can output images with diminished color moiré by using combinations of dither matrices.

DESCRIPTION

In some cases that beams emitted from the exposure device are irregular in size, electrophotographic printers can produce white streaks in areas of low printing density or black streaks in areas of high printing density. However, the conventional technology described above does not suppress the occurrence of such white or black streaks.

In view of the foregoing, it is an object of the present disclosure to provide an image forming device and method capable of suppressing the occurrence of white or white streak when the size of the beam emitted by the exposure device is irregular.

In order to attain the above and other object, the present disclosure provides an image forming device. The image forming device includes a photosensitive drum, an exposure device, a developing member, and a controller. The exposure device is configured to expose the photosensitive drum to light to form an electrostatic latent image thereon. The developing member is configured to develop the electrostatic latent image on the photosensitive drum. The controller is configured to convert continuous-tone image data to raster image data using a dither matrix, the continuous-tone image data including pixels each has a tone value. The raster image data is binary image data corresponding to exposure areas. The dither matrix includes threshold values for converting the continuous-value image data to the raster image data. The dither matrix is configured so that as an exposure area percentage of the raster image data increases, growth of the exposure area progresses according to a growth process including: a stage at which an exposure area extends in a predetermined screen direction from an isolated exposure area to connect with another isolated exposure area; and a stage at which after the isolated exposure area connects with another isolated exposure area, the exposure area extends in a crossing direction crossing the predetermined screen direction. The controller is configured to control the exposure device to expose the photosensitive drum based on the raster image data.

According to another aspect, the disclosure provides a method for generating raster image data from continuous-tone image data using a dither matrix. The continuous-tone image data includes pixels each has a tone value. The raster image data is binary image data corresponding to exposure areas. The dither matrix includes threshold values for converting the continuous-value image data to the raster image data. The method includes: configuring the dither matrix so that as an exposure area percentage of the raster image data increases, growth of the exposure area progresses according to a growth process including: a stage at which an exposure area extends in a predetermined screen direction from an isolated exposure area to connect with another isolated exposure area; and a stage at which after the isolated exposure area connects with another isolated exposure area, the exposure area extends in a crossing direction crossing the predetermined screen direction; converting the continuous-tone image data to raster image data using the configured dither matrix; and controlling an exposure device to expose a photosensitive drum based on the exposure area in the regular pattern.

According to the configurations described above, even when the beam diameter is irregular, the generation of black streaks can be suppressed.

Structure of an Image Forming Apparatus 1

Figure 1:
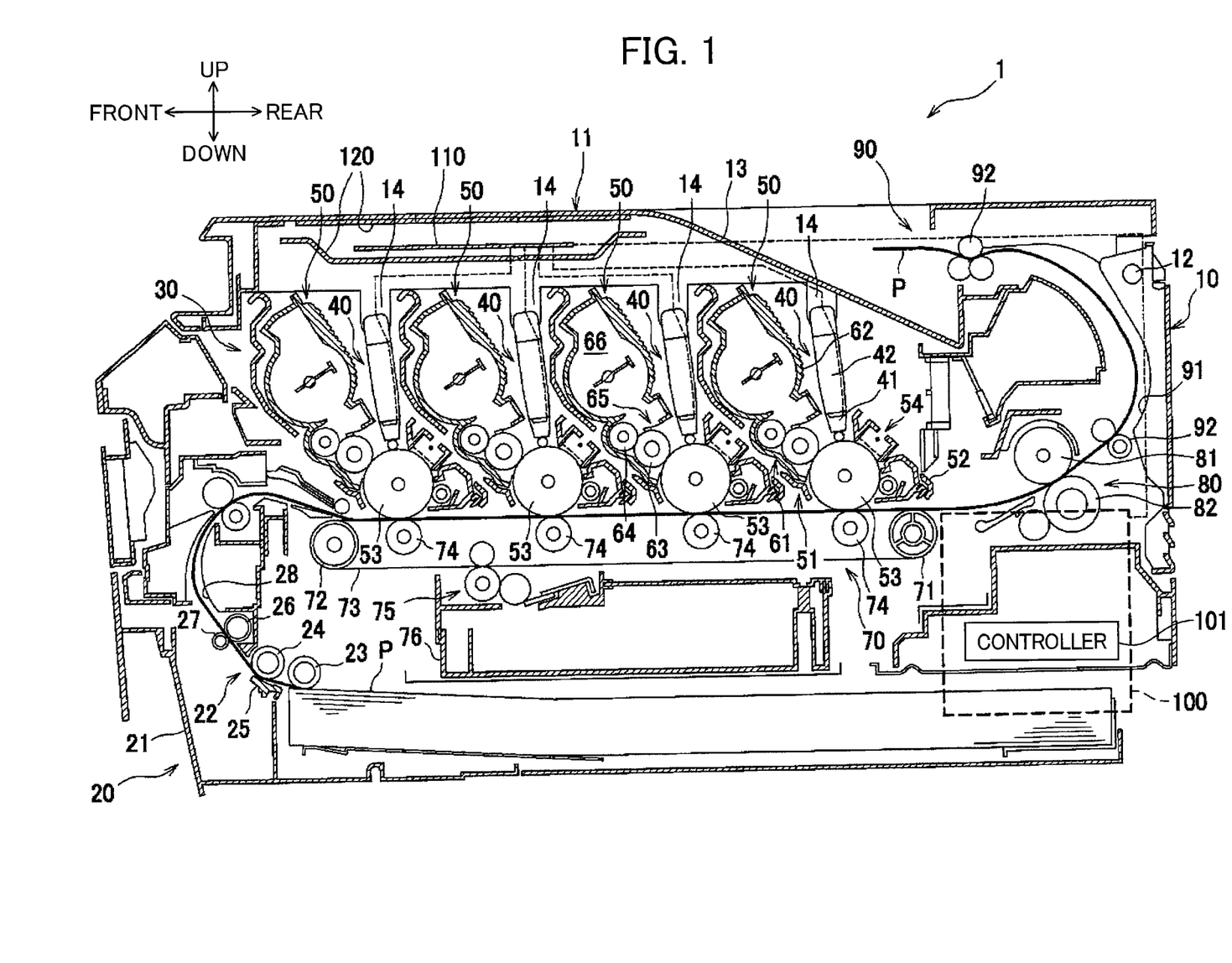
FIG. 1 is a schematic diagram showing a structure of an image forming device.

FIG. 1 is a schematic diagram showing the structure of an image forming device 1 according to an embodiment of the present disclosure. In the present embodiment, a color LED printer is described as an example of the image forming device 1. Note that the left side of the image forming device 1 in FIG. 1 will be considered the front side, while the right side will be considered the rear side. Further, vertical directions in the drawing are likewise considered the up and down directions in the following description.

As shown in FIG. 1, the image forming device 1 is provided with a main casing 10 and, within the main casing 10, a sheet-feeding member 20 for supplying sheets P to be printed, an image forming member 30 for forming images on sheets P supplied by the sheet-feeding member 20, a sheet-discharging member 90 for discharging sheets P from the main casing 10 after images have been formed on the sheets P, and a main board 100 that controls each element or member when forming images. Here, a controller 101 is mounted on the main board 100 for performing this control.

An opening is formed in the top of the main casing 10. The opening is covered by an upper cover 11 that opens and closes over the opening. The upper cover 11 can rotate about a rotational shaft 12 provided on the rear side of the upper cover 11 so that the front of the upper cover 11 moves up and down. The top surface of the upper cover 11 constitutes a discharge tray 13 that collects sheets P discharged from the main casing 10. A plurality of retaining members 14 is provided on the bottom surface of the upper cover 11. The retaining members 14 retain LED units 40, which serve as the exposure devices. Provided inside the upper cover 11 are an LED control board 110 and shielding plates 120. The shielding plates 120 are arranged to face the LED control board 110 from above and below.

The sheet-feeding member 20 is disposed in the bottom section of the main casing 10. The sheet-feeding member 20 is primarily provided with a paper tray 21 that is detachably mounted in the main casing 10, and a sheet-feeding mechanism 22 that conveys sheets P from the paper tray 21 toward the image forming member 30. The sheet-feeding mechanism 22 is positioned on the front side of the paper tray 21. The sheet-feeding mechanism 22 is primarily provided with a sheet-feeding roller 23, a separating roller 24, and a separating pad 25.

The sheet-feeding member 20 having this configuration separates and feeds sheets P from the paper tray 21 upward one sheet at a time. Each sheet P conveyed by the sheet-feeding member 20 first passes between a paper dust roller 26 and a pinch roller 27, which remove paper dust from the sheet, before entering a conveying path 28. The conveying path 28 redirects the sheet in a rearward direction and supplies the sheet to the image forming member 30.

The image forming member 30 is primarily configured of four process cartridges 50, four LED units 40, a transfer unit 70, and a fixing unit 80.

The LED units 40 are arranged above photosensitive drums 53 described later, which are an example of the photosensitive members. Each LED unit 40 primarily includes an LED print head 41, and a support frame 42. Each LED print head 41 is arranged in a position confronting a corresponding photosensitive drum 53.

The support frame 42 is a member that supports the corresponding LED print head 41. Each support frame 42 is pivotably mounted on the upper cover 11 via the corresponding retaining member 14. With this arrangement, the LED units 40 (the LED print heads 41) move from an exposure position in which the LED print heads 41 confront the photosensitive drums 53 to a retracted position above the exposure position as the upper cover 11 is rotated upward.

The process cartridges 50 are juxtaposed in the front-rear direction between the upper cover 11 and the sheet-feeding member 20. Each process cartridge 50 is provided with a drum unit 51, and a developing device 61 that is detachably mounted on the drum unit 51. The process cartridges 50 can be replaced through the opening formed in the main casing 10 after the upper cover 11 has been rotated upward. All of the process cartridges 50 have the same configuration and differ only in the color of toner (developer) accommodated in a toner compartment 66 of the developing device 61.

Each drum unit 51 is primarily configured of a drum frame 52, a photosensitive drum 53 rotatably supported in the drum frame 52, and a charger 54.

The developing devices 61 develop electrostatic latent images that have been formed on the corresponding photosensitive drums 53. Each developing device 61 is provided with a developing frame 62, a developing roller 63 and a supply roller 64 that are rotatably supported in the developing frame 62, and a thickness-regulating blade 65. The developing device 61 also has a toner compartment 66 for accommodating toner.

The transfer unit 70 is disposed between the sheet-feeding member 20 and the process cartridges 50. The transfer unit 70 is primarily provided with a drive roller 71, a follow roller 72, a conveying belt 73, transfer rollers 74, and a cleaning member 75. The transfer unit 70 is for transferring toner images on the photosensitive drums 53 onto the sheet P.

The drive roller 71 and the follow roller 72 are arranged parallel to each other while being separated in the front-rear direction. The conveying belt 73 is configured of an endless belt that is stretched around the drive roller 71 and the follow roller 72. The outer surface of the conveying belt 73 contacts the photosensitive drums 53. Four transfer rollers 74 are disposed inside the conveying belt 73 at positions opposing corresponding photosensitive drums 53 such that the conveying belt 73 is interposed between the transfer rollers 74 and the photosensitive drums 53. During transfer of toner images from the photosensitive drums 53 to the sheet P in the transfer unit, a transfer bias is applied to the transfer rollers 74 through constant current control.

The cleaning member 75 is disposed below the conveying belt 73. The cleaning member 75 is configured to remove toner adhering to the conveying belt 73 and to drop the toner into a toner receptacle 76 provided beneath the cleaning member 75.

The fixing unit 80 is disposed to the rear of the process cartridges 50 and the transfer unit 70. The fixing unit 80 is provided with a heating roller 81, and a pressure roller 82 that is arranged so as to confront and press against the heating roller 81.

In the image forming member 30 having this configuration, each charger 54 first applies a uniform charge to the surface of the corresponding photosensitive drum 53. Subsequently, the charged surface is exposed to LED light emitted from the corresponding LED print head 41, whereby electrostatic latent image is formed on each photosensitive drum 53 based on image data.

Toner in each toner compartment 66 is supplied onto the corresponding developing roller 63 by the rotation of the supply rollers 64. As the developing roller 63 rotates, the toner passes between the developing roller 63 and the corresponding thickness-regulating blade 65, which regulates the toner carried on the developing roller 63 to a uniform thin layer.

As the developing roller 63 rotates in contact with the photosensitive drum 53, the toner carried on the developing roller 63 is supplied to the electrostatic latent image formed on the photosensitive drum 53. As a result, the toner is selectively attracted to the latent images formed on the photosensitive drums 53, making the latent images visible and forming toner images through a process of reverse development.

As a sheet P supplied onto the conveying belt 73 passes sequentially between each photosensitive drum 53 and the corresponding transfer roller 74 disposed inside the conveying belt 73, the toner images formed on the photosensitive drums 53 are sequentially transferred onto the sheet P. The toner images transferred onto the sheet P are subsequently thermally fixed to the sheet P as the sheet P passes between the heating roller 81 and the pressure roller 82.

The sheet-discharging member 90 is primarily provided with a discharge-side conveying path 91 and a plurality of pairs of conveying rollers 92 for conveying the sheets P. The discharge-side conveying path 91 extends upward from the exit side of the fixing unit 80 and curves back to a forward direction. After toner images have been transferred onto and thermally fixed to a sheet P, the conveying rollers 92 convey the sheet P along the discharge-side conveying path 91 and discharge the sheet P from the main casing 10 to be accumulated in the discharge tray 13.

Structure of the LED Print Heads 41

Figure 2:
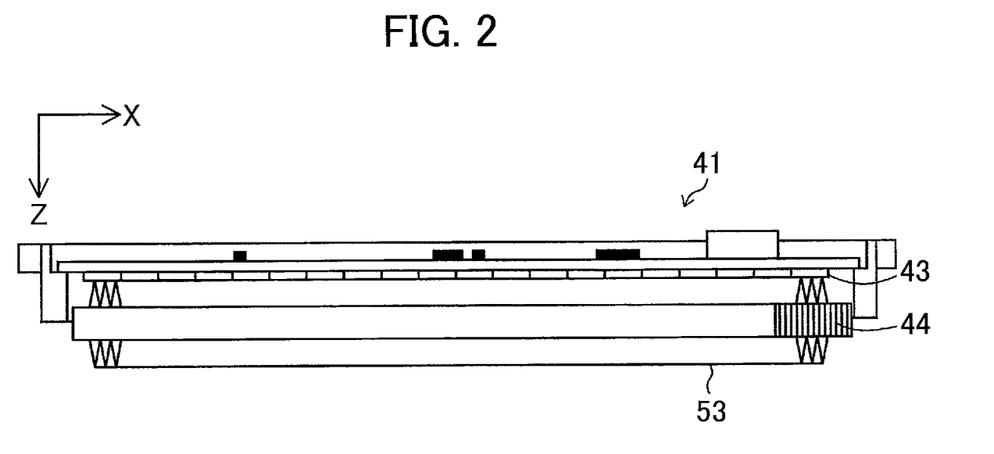
FIG. 2 is a schematic diagram showing a structure of an LED print head shown in FIG. 1.

FIG. 2 is a schematic diagram showing the structure of one of the LED print heads 41 shown in FIG. 1. As shown in FIG. 2, each LED print head 41 is provided with an LED array 43, and a lens array 44 disposed in a position opposing the plurality of LED arrays 43. The LED array is a semiconductor having a plurality of light-emitting elements arranged in the X-direction. The lens array 44 has refractive index distribution type lenses (gradient index type lenses) 44A arranged in the X-direction. Accordingly, light emitted from the light-emitting elements of the LED arrays 43 form an erect equal-magnification image on the corresponding photosensitive drum 53, which is the imaging surface.

Figure 3:
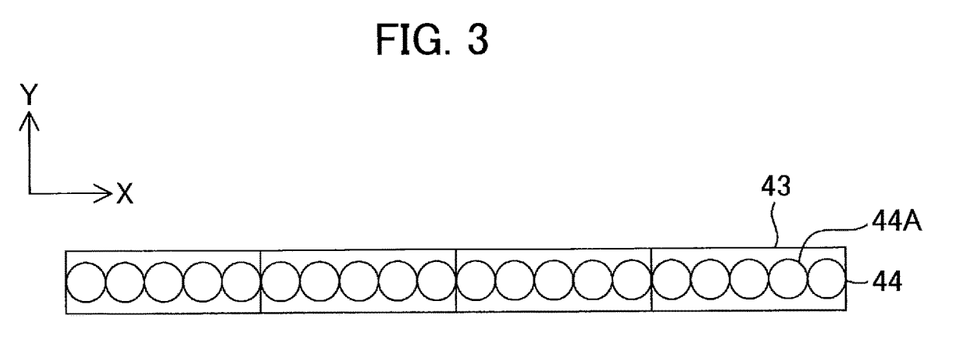
FIG. 3 is a diagram showing the LED print head of FIG. 2 when viewed from a direction opposite to the Z-direction.

FIG. 3 shows the LED print head 41 of FIG. 2 when viewed from a direction opposite to the Z-direction. The refractive index distribution type lenses 44A configuring the lens array 44 are arranged in a row in the X-direction. The number of light-emitting elements provided in the LED array 43 is greater than the number of refractive index distribution type lenses 44A possessed by the lens array 44.

Since the refractive index distribution type lenses 44A constituting the lens array 44 in this configuration are arranged in a row in the X-direction, any deviation of individual refractive index distribution type lenses 44A will cause the diameter of the respective emitted beam to deform vertically (Y-direction) or horizontally (X-direction) from the ideal state. Such deformation in beam diameter may lead to a degraded image quality.

Overview of Line Screen Dithering

In line screen dithering, each of line segments extends in a specific angular direction (hereinafter referred to as the screen direction, where the angle of the screen direction measured counterclockwise from the X direction is called the screen angle). The line segments are arranged periodically at an arbitrary spacing. On a color printer, the dither patterns commonly have different screen angles for each of the colors cyan (C), magenta (M), yellow (Y), and black (K) in order to avoid color moiré caused by interference among dithering periods of different colors.

As an example, the screen angle can be set to 75 degrees for magenta, 45 degrees for black, 15 degrees for cyan, and 0 degrees for yellow. Thus, a dither pattern for magenta, for example, is grown in a direction of a screen angle of 45 degrees. In the embodiments, binary raster image data generated from the image data by binarizing each tone value (pixel value) in the image data using a dither matrix. The binary raster image data shows the dither pattern shown in each of FIGS. 4A and 4B. The set of binary raster image data of the example shown in each of FIGS. 4A and 4B is generated from the image data in which all the pixels having the same tone value.

The combination of each color and screen angle is arbitrary. For example, the screen angle may be set to 45 degrees for the magenta dither pattern, 15 degrees for the black dither pattern, 0 degrees for the cyan dither pattern, and 75 degrees for the yellow dither pattern. Further, while screen angles of 75 degrees, 45 degrees, 15 degrees, and 0 degrees are set in this example, other screen angles may be used.

Figure 4A:
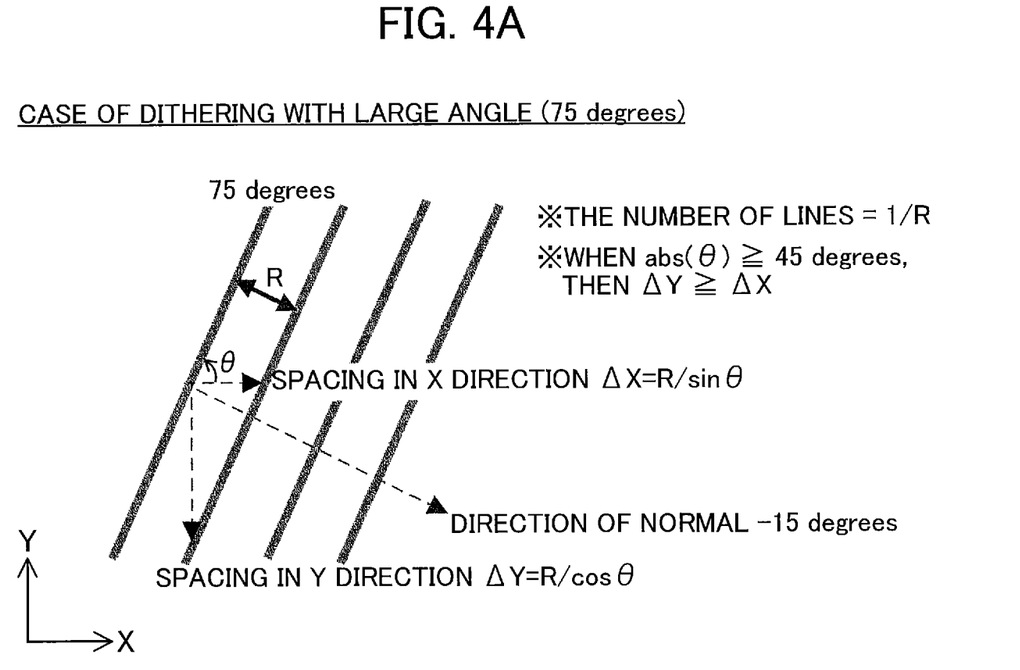
FIGS. 4A and 4B are explanatory diagrams showing examples of relationships between screen angles and line spacing.
Figure 4B:
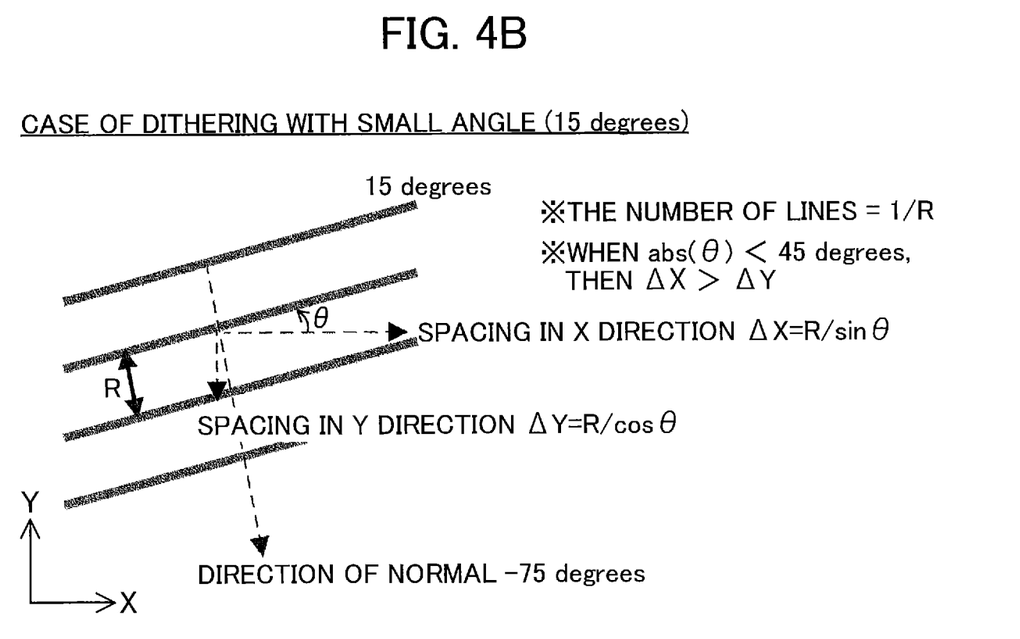

FIGS. 4A and 4B show relationships between screen angles and line spacing. FIG. 4A shows a relationship between a screen angle and line spacing when the screen angle is a large angle (75 degrees). When the line spacing is R (inches), then the number of lines per inch (i.e., the screen ruling) can be expressed as 1/R lines per inch (lpi). The greater the number of lines, the less noticeable the halftone dots are to the naked eye and the higher the quality of image that can be obtained. However, a high screen ruling also comes with some disadvantages, such as worsening tonality (lost detail) and susceptibility to banding.

Further, when the screen angle is θ, the spacing ΔX between line segments in the X-direction and the spacing ΔY between line segments in the Y-direction can be found from the following Equations 1 and 2. Here, the screen angle θ has a range of: −90 degrees≤θ≤90 degrees. A negative value of the screen angle indicates an angle measured clockwise from the X direction.

$$\Delta X = R/\sin(\theta) \text{(inches)} \quad \text{(Eq. 1)}$$

$$\Delta Y = R/\cos(\theta) \text{(inches)} \quad \text{(Eq. 2)}$$

Hence, when abs(θ)≥45 degrees, then ΔY≥ΔX. Here, abs(θ) denotes the absolute value of θ. In the example of FIG. 4A, the direction of the normal to the line segments has an angle of −15 degrees.

FIG. 4B shows the relationship between the screen angle and line spacing when the screen angle is a small angle (15 degrees). When the screen angle is θ, the spacing ΔX between line segments in the X-direction and the spacing ΔY between line segments in the Y-direction can be found from the above Equations 1 and 2. Hence, when abs(θ)<45 degrees, ΔX>ΔY. In the example of FIG. 4B, the direction of the normal to the line segments has an angle of −75 degrees.

By focusing on the spacing between the line segments in the X-direction and Y-direction in this way, lines having the same spacing will have different spacing in the X-direction and Y-direction depending on the screen angle of the dither. Below, the mechanism by which screen angles generate dark streaks (black streaks) will be described.

Mechanism of Black Streak Generation

Figure 5A:
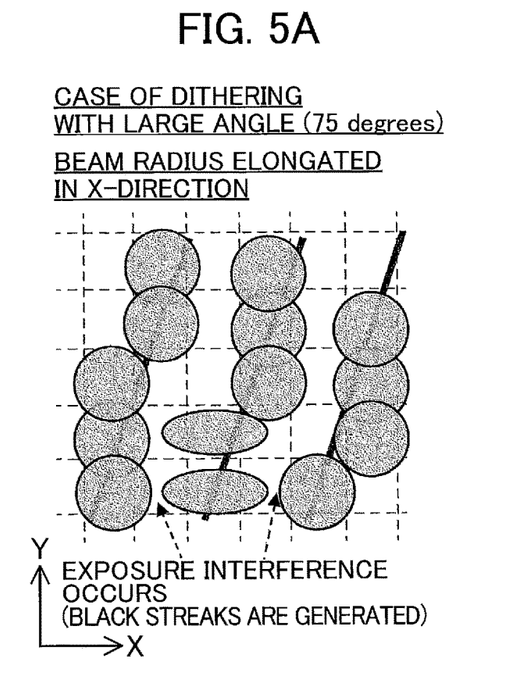
FIGS. 5A-5D are explanatory diagrams showing cases in which beam spots based on a dither pattern are elongated in the X-direction or Y-direction.

FIGS. 5A-5D show cases in which beam spots based on a dither pattern are elongated in the X-direction or Y-direction. FIG. 5A shows a case in which some beam spots are elongated in the X-direction when beam spots are formed based on a dither pattern having a large screen angle (75 degrees). Since the diameter of this exposure beam is long in the X-direction in FIG. 5A, exposure interference occurs with pixels to the left and right when forming an electrostatic latent image, resulting in toner adhering to areas which are not exposed as pixels (or, which are not an area to be exposed based on image data). This results in the generation of black streaks, which are streak-like artifacts extending in the Y-direction where a large amount of toner was deposited. Since line spacing in the X-direction is narrow when the screen angle is large, as described above, exposure interference with pixels to the left and right due to the beam diameter being elongated in the X-direction becomes more pronounced. Thus, black streaks are more likely to occur in a case that the exposure beam is long in the X-direction and the screen angle is large.

Figure 5B:
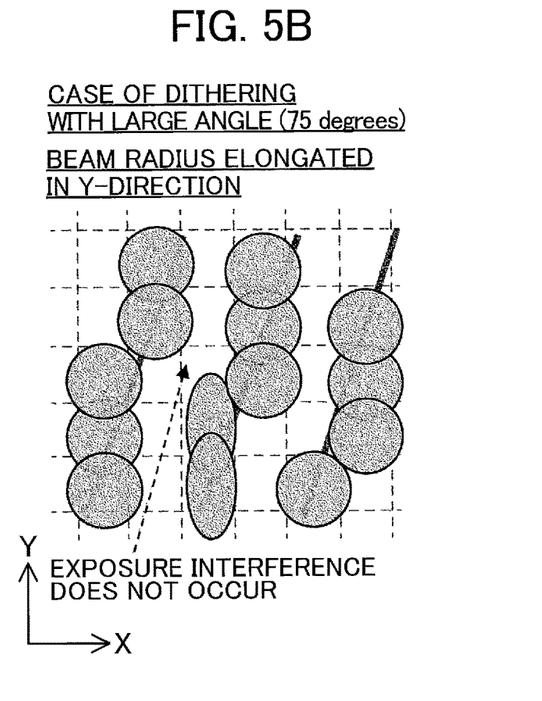

FIG. 5B shows a case in which the beam spot is elongated in the Y-direction when formed based on a dither pattern having a large screen angle (75 degrees). However, although the diameter of the exposure beam is long in the Y-direction, interference does not occur since the line spacing is wide in the Y-direction, as illustrated in FIG. 5B. As described above, the line spacing narrows in the X-direction when the screen angle is large, but no exposure interference occurs with pixels to the left and right since the beam is elongated in the Y-direction. Thus, black streaks are not produced in a case that the exposure beam is elongated in the Y-direction and the screen angle is large.

Figure 5C:
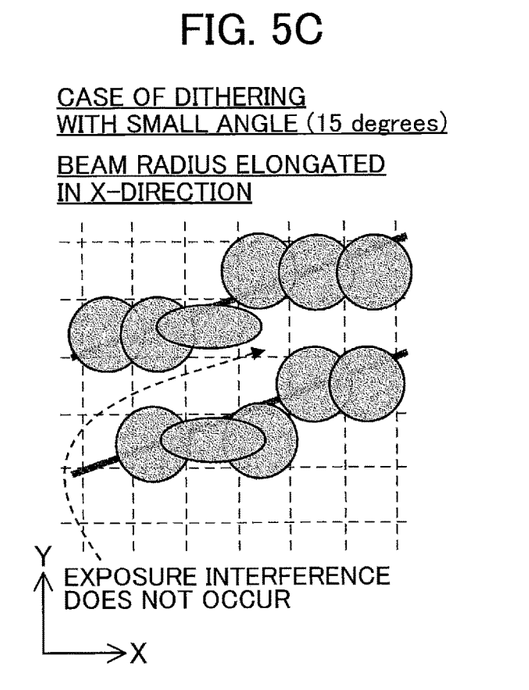

FIG. 5C shows a case in which the beam spot is elongated in the X-direction when formed based on a dither pattern having a small screen angle (15 degrees). Although the diameter of the exposure beam is long in the X-direction in FIG. 5C, interference does not occur because of the wide spacing between lines. Thus, since the line spacing in the X-direction is wide when the screen angle is small, as described above, exposure interference with upper and lower pixels does not occur, even though the beam diameter is long in the X-direction. Therefore, black streaks are not produced in a case that the diameter of the exposure beam is long in the X-direction and the screen angle is small.

Figure 5D:
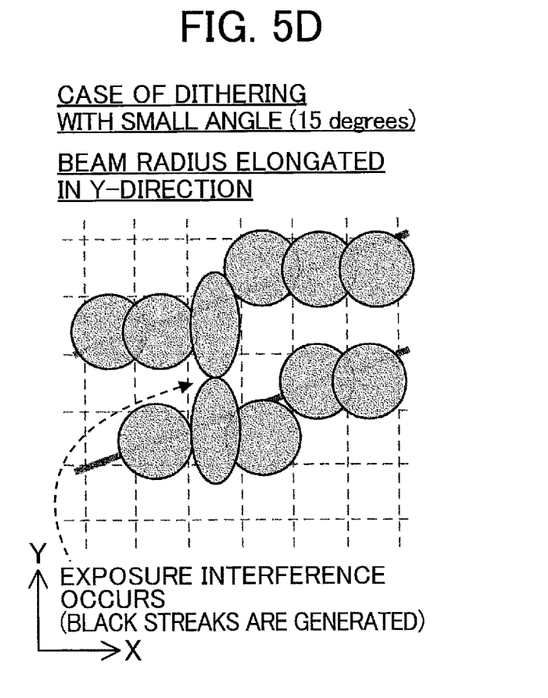

FIG. 5D shows a case in which the beam spot is elongated in the Y-direction when formed based on a dither pattern having a small screen angle (15 degrees). Since the diameter of the exposure beam is elongated in the Y-direction in FIG. 5D black streaks are generated due to exposure interference with upper and lower pixels. Therefore, since the line spacing in the Y-direction is narrow when the screen angle is small, as described above, exposure interference with upper and lower pixels is more prominent when the beam spot is elongated in the Y-direction. Thus, black streaks are more likely to be generated in a case that the screen angle is small and the exposure beam is elongated in the Y-direction.

Measures to Suppress Black Streaks

Figure 6A:
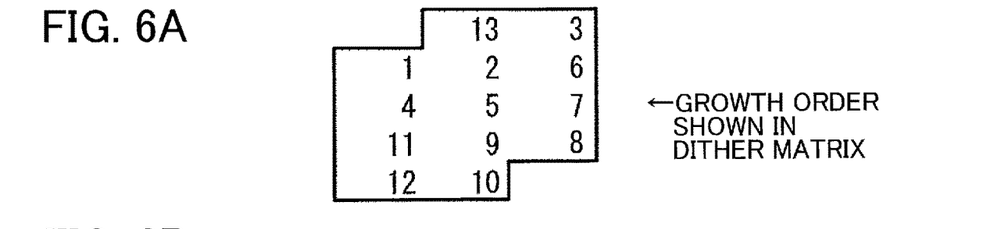
FIGS. 6A and 6B are explanatory diagrams for illustrating a dither matrix for suppressing generation of black streaks.
Figure 6B:
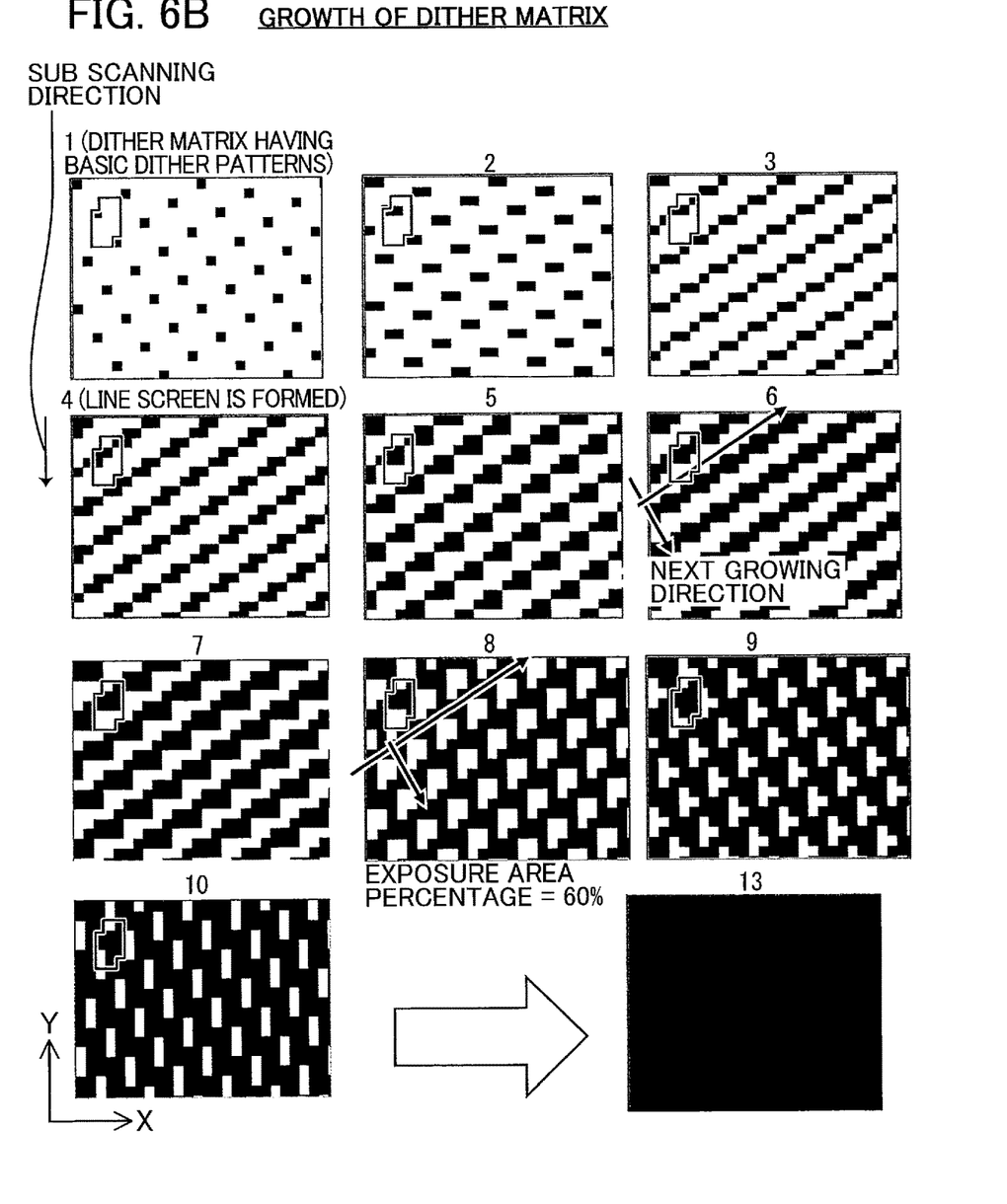

FIGS. 6A and 6B are diagrams for illustrating a dither matrix for suppressing the generation of black streaks. FIG. 6A shows an example of the dither matrix. The dither matrix has a substantially rectangular shape with an upper left notch and a bottom right notch. The dither matrix includes, as entries, the numerals 1-13 as threshold values. In this example, the image data has, as pixel values, tone (gradation) values. Each tone value can have one of multiple values 0-13 in this example. However, the tone value may have one value of multi levels, such as 0-255. The tone value indicates a color density or thickness of the pixel. When the tone value increases, a degree of a density or thickness of the pixel increases. The image data is converted to the binary raster image data by using the dither matrix.

FIG. 6B shows 13 binary raster images indicated by the numbers 1-13. Each binary raster image shows a dither pattern in which a plurality of basic dither patterns is arranged regularly. Black areas in the dither pattern (or the basic dither patterns) indicates exposure areas. In FIG. 6B, the basic dither pattern is depicted by the bold line having the same shape of the dither matrix. Hereinafter, the binary raster image (data) or the dither pattern indicated by the number "N" will be simply described the binary raster image (data) N or the dither pattern N.

13 sets of binary raster image data are, representing 13 images shown in FIG. 6B, respectively generated by converting 13 sets of image data which are different from each other by using the dither matrix. That is, in this example, when the raster image data "N" is generated by image data, the image data has the common pixel value (tone value) "N" for all the pixels therein. For example, the first binary raster image of the number "1" in FIG. 6B (upper leftmost pattern) is generated from the image data having the pixel value (tone value) "1", which is the same as the number "1", for all the pixels. Similarly, the second binary raster image of the number "2" in FIG. 6B is generated from the image data having the pixel value (tone value) "2", which is the same as the number "2", for all the pixels.

When binarizing the image data, a part of the pixels in the image data which forms the same shape of the dither matrix is compared to the dither matrix. In this case, the tone values of the image data are compared to the corresponding threshold values in the dither matrix. When the tone value is greater than or equal to the corresponding threshold value, the tone value is converted to an exposure value indicating an exposure area (black area shown in FIG. 6B). Here, the exposure area indicates that the area is to be exposed. When the tone value is less than the corresponding threshold value, the tone value is converted to a non-exposure value indicating a non-exposure area. Here, the non-exposure area indicates that the area is not to be exposed. By repeating the comparison between the part of pixels in the image data and the dither matrix described above while shifting the position of the part of the pixels to be compared with the dither matrix, the image data is converted to the binary raster image data shown FIG. 6B. Accordingly, the binary raster image data representing the dither pattern is binary data having one of the exposure value and the non-exposure value for each pixel. As shown in FIG. 6B, as the tone value of the inputted image data increases, the dither pattern is grown or developed according to the order of the numbers 1-13. In other words, a development process of the dither pattern includes 1-13 growth stages. At the growth stage "N", the binary raster image data N is converted from the image data having a single (common) tone value "N" for all pixels therein. At this growth stage N, tone values of pixels corresponding to (compared with) threshold values 1 to N of the dither matrix are converted to the exposure value indicating the exposure area since all of these tone values are equal to "N" greater than or equal to any of values from 1 to N. In this case, the remaining pixel values of pixels corresponding to (compared with) the threshold values N+1 to 13 of the dither matrix are converted to the non-exposure value indicating the non-exposure area since these tone values are equal to "N" is less than any of values from N+1 to 13. Growing the dither pattern (or the basic dither pattern) indicates increasing exposure areas (pixels) thereof one-by-one in the growth order from an initial stage (not shown) in which all elements in the dither pattern indicates non-exposure areas. That is, when the tone value of the image data increases and the dither pattern (or the basic dither pattern) is grown, an exposure area percentage of the dither pattern (or the basic dither pattern) increases. Here, the exposure area percentage of the dither pattern (or the basic dither pattern) indicates a percentage of the exposure areas to the all the areas in the dither pattern (or the basic dither pattern).

In each of the binary raster images (dither patterns) 1-13, the basic dither patterns (regular patterns) at the corresponding growth stage, as repeating units, are cyclically arranged to form the dither pattern. In this example, the basic dither patterns in the dither pattern are arranged in the screen direction which is a substantially upper right direction. For example, the image 3 in FIG. 6B shows the growth of the basic dither pattern at the stage 3 at which elements (pixels) corresponding to the numerals "1"-"3" of the dither matrix are set to the exposure area. That is, the image 3 shows the basic dither pattern growing up to the numeral "3" in the corresponding dither matrix. Since the basic dither pattern is grown according to an order of the numerals 1-13 shown in the dither matrix of FIG. 6A, the numerals 1-13 indicates a growth order in which the corresponding basic dither pattern is grown as the input tone value of the image data increases. In other words, as the exposure area percentage increases, the growth of the exposure area progresses according to this growth order.

The controller 101 converts the image data to binary raster image data based on the dither matrix. As shown in the binary raster images of FIG. 6B, a basic dither pattern is grown in a predetermined screen direction from an isolated pixel corresponding to the numeral "1" of the dither matrix, as the tone value in the image data increases. After generating the basic dither pattern grown at one of the growth stages 1 through 13 according to the growth order, the controller 101 controls the LED unit 40 to expose the photosensitive drum 53 based on the generated dither pattern. Hereinafter, a pixel in the basic dither pattern corresponding to (compared with) the numeral (threshold value) "k" in the dither matrix is simply described a pixel "k".

The dither matrix is configured so that the dither pattern grows according to the development process having the growth stages 1-13 as shown in FIG. 6B as the tone value of the input image data increases. Specifically, as indicated by the growth order in the dither matrix of FIG. 6A, the dither pattern grows according to the development process in which an isolated pixel (original pixel) "1" is formed as the exposure area in each basic dither pattern at the growth stage 1, and subsequently basic dither patterns grow in the predetermined screen direction at the growth stages 2 and 3. Accordingly, the pixels "2" and "3" set as exposure areas. Each basic dither pattern becomes connected to an adjacent basic dither pattern at the growth stage 3. In other words, the pixel "3" set as the exposure area at the stage 3 is in contact with (or connects with) an adjacent basic dither pattern in the screen direction (the adjacent basic dither pattern at upper rightward).

At the growth stage 4, the dither matrix grows so that the basic dither pattern grows in the sub scanning direction from the pixel "1" (isolated pixel), and at the growth stages 5 and 6 the basic dither pattern is thickened by growing up to pixels "5" and "6" respectively in the predetermined screen direction. Subsequently at the growth stage 7, the basic dither pattern grows in a direction crossing the predetermined screen direction.

At the growth stage 8 the dither matrix continues growing so that the basic dither pattern extends in a direction (90 degrees) crosses the predetermined screen direction. As a consequence, each basic dither pattern becomes connected to adjacent upper and lower patterns. At this point, the exposure area percentage is at least a prescribed value (60%).

As described above, the pixels "1", "2", and "3" set as the exposure areas form a line extending in the screen direction. Here, each of the pixels "1", "2", and "3" is in contact with each other. Here, "a certain pixel in contact (or connection) with another pixel" may indicate that another pixel is one of 8 neighboring pixels surrounding a certain pixel. The pixels "4", "5", and "6" set as the exposure areas also form a line extending in the screen direction, and this line is in contact with the line formed by the pixels "1", "2", and "3" to thicken the pattern. The pixels "7" and "8" set as the exposure areas form a line crossing the screen direction, and this line is in contact with the thickened line formed by the pixels "1", "2", "3", "4", "5", and "6".

Thus, since unexposed areas remain as concentrated areas rather than lines, differences in toner deposition are less likely to occur when the beam diameter of the LED unit 40 is irregular, and the generation of black streaks can be suppressed.

FIGS. 7A-7D provide a comparison between a general dither pattern and the dither pattern of the present embodiment. The dither patterns in FIGS. 7A-7D correspond to the dither pattern according to the present embodiment at the growth stage 8 shown in FIG. 6B.

Figure 7A:
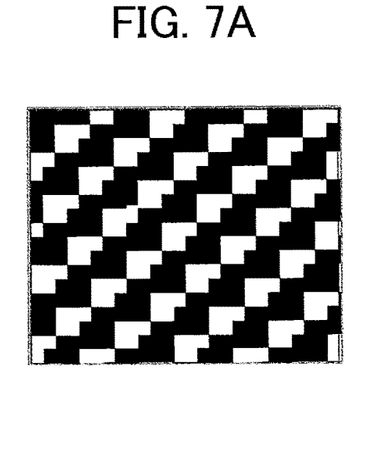
FIGS. 7A-7D are explanatory diagrams for comparing a general dither pattern with a dither pattern of an embodiment.
Figures 7B, 7D:
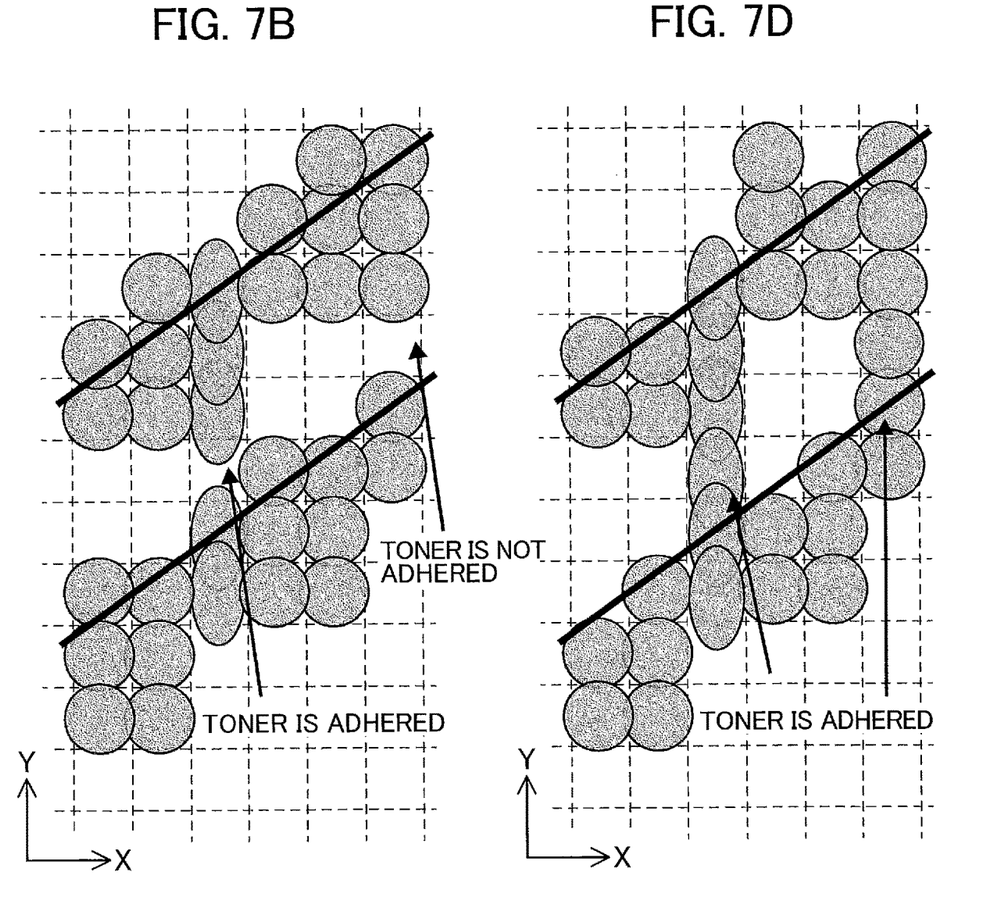

The pattern in FIG. 7A shows a comparative example of a general dither pattern corresponding to the dither pattern at the growth stage 8. FIG. 7B shows a case in which the diameter of the third exposure beam from the left is elongated in the Y-direction when beam spots are formed based on the dither pattern shown in FIG. 7A. As shown in FIG. 7B, upper and lower exposure beam spots are close together in the area where the diameter of the exposure beam is elongated in the Y-direction, causing toner to adhere to these regions. On the other hand, since the upper and lower exposure beam spots are not close to each other in areas where the beam spots are not elongated in the Y-direction, toner does not adhere to these regions. Thus, black streaks are generated in areas where the exposure beams are elongated in the Y-direction.

Figure 7C:
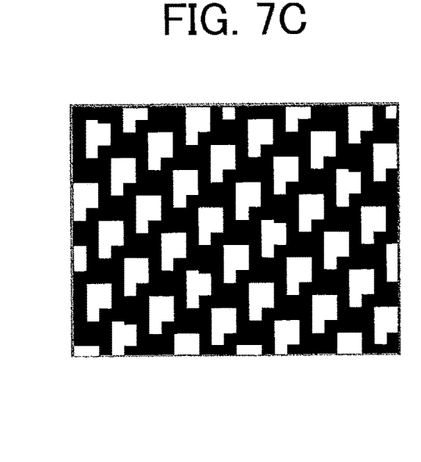

The pattern in FIG. 7C corresponds to the dither pattern at the growth stage 8 according to the present embodiment. FIG. 7D shows a case in which the diameter of the third exposure beam from the left is elongated in the Y-direction when beam spots are formed based on the dither pattern shown in FIG. 7C. As shown in FIG. 7D, the upper and lower exposure beam spots overlap in the area where the beam diameter is elongated in the Y-direction, causing toner to adhere in these regions. On the other hand, since the upper and lower exposure beam spots overlap in areas where the beam diameter is not elongated in the Y-direction, toner is also deposited in these regions. Thus, a black streak is not generated in areas where exposure beams are elongated in the Y-direction.

Measures to Suppress White and Black Streaks

Figure 8A:
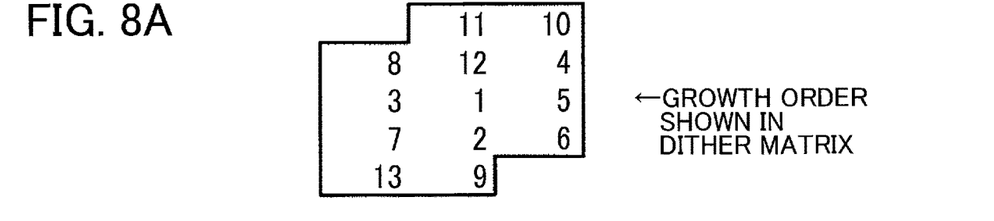
FIGS. 8A and 8B are explanatory diagrams for illustrating a dither matrix for suppressing generation of white and black streaks.
Figure 8B:
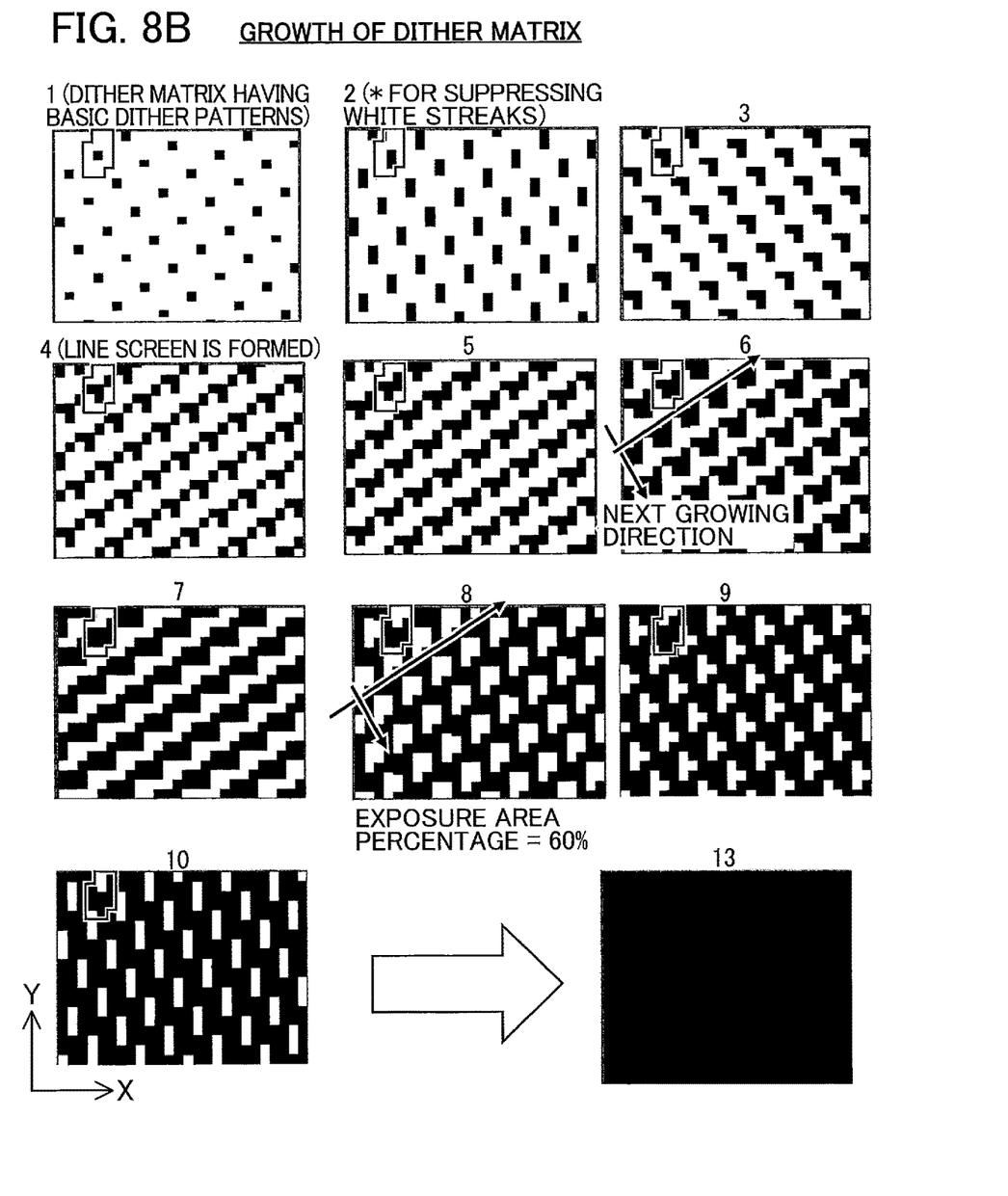

FIG. 8A show a dither matrix for suppressing the generation of white and black streaks. Similarly to FIG. 6A, FIG. 8A shows a dither matrix having threshold values 1-13 as entries which indicate a growth order of the dither pattern. FIG. 8B includes overall binary raster images 1 through 13 generated by converting 13 sets of image data using the dither matrix shown in FIG. 8B, similarly to FIG. 6B. Similarly to the example shown in FIG. 6B, 13 sets of binary raster image data are, representing 13 images shown in FIG. 8B, respectively generated by converting 13 sets of image data which are different from each other by using the dither matrix. That is, when the raster image data "N" is generated by image data, the image data has the common pixel value (tone value) "N" for all the pixels therein. For example, the first binary raster image of the number "1" in FIG. 8B (upper leftmost pattern) is generated from the image data having the pixel value (tone value) "1", which is the same as the number "1", for all the pixels.

In each of the images 1-13, the basic dither patterns (regular patterns) at the corresponding growth stage, as repeating units, are cyclically arranged. For example, image 3 in FIG. 8B shows the basic dither pattern growing up to the numeral 3 according to the grows order indicated by the dither matrix.

The dither matrix is configured so that the dither pattern grows according to the development process having the growth stages 1-13 as shown in FIG. 8B as the tone value of the input image data increases. As indicated by the growth order indicated by the dither matrix of FIG. 8A, the dither pattern grows so that an isolated pixel (original pixel) "1" is formed as the exposure area in each basic dither pattern at the growth stage 1. At the growth stage 2, the dither pattern next grows so that the basic dither pattern extends in the sub scanning direction from the isolated pixel "1". Through this configuration, the dither pattern can suppress the generation of white streaks, as described below.

At the growth stage 3, the dither pattern grows so that a pixel "3" on the left side of the isolated pixel "1" is formed as the exposure area, and at the growth stage 4 the dither pattern grows so that the basic dither pattern extends in the predetermined screen direction. Each basic dither pattern becomes connected to adjacent basic dither patterns at the growth stage 4.

Thereafter, at the growth stages 5 and 6 the dither pattern grows so that the basic dither pattern extends in the sub scanning direction. At the growth stage 7, the dither pattern grows so that the basic dither pattern extends below the pixels formed in the stage 3, thereby thickening the pattern by growing a pixel "7" as the exposure area in the predetermined screen direction.

In the growth stage 8, the dither pattern grows so that the basic dither pattern extends above the pixel formed at the stage 3 in a direction crossing the screen direction. As a consequence, each basic dither pattern becomes connected to adjacent upper and lower basic dither patterns. At this point, the exposure area percentage is at least a prescribed value (60%).

As described above, the pixels "1", "3", and "4" set as the exposure areas form a line extending the screen direction. Here, each of the pixels "1", "3", and "4" is in contact with (connects with) each other. The pixel "7" is in contact with (connects with) the line formed by the pixels "1", "3", and "4" to thicken the pattern. The pixel "8" set as the exposure areas forms a line crossing the screen direction, and this line is in contact with (connects with) the thickened line formed by the pixels "1", "3", "4", and "7".

Thus, since unexposed areas remain as concentrated areas rather than lines, differences in toner deposition are less likely to occur when the diameters of beams emitted by the LED unit 40 are irregular, and the generation of black streaks can be suppressed.

FIGS. 9A-9D provide a comparison between beam spots based on a general dither pattern and beam spots based on the dither pattern of the present embodiment. The dither patterns for forming beam spots shown in FIGS. 9A-9D correspond to the pattern according to the present embodiment at the growth stage 2 shown in FIG. 8B.

Figure 9A:
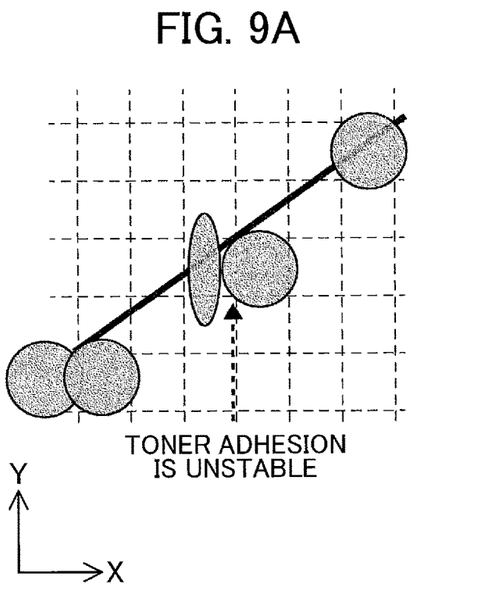
FIGS. 9A-9D are explanatory diagrams for comparing a general dither pattern with a dither pattern of an embodiment.
Figure 9B:
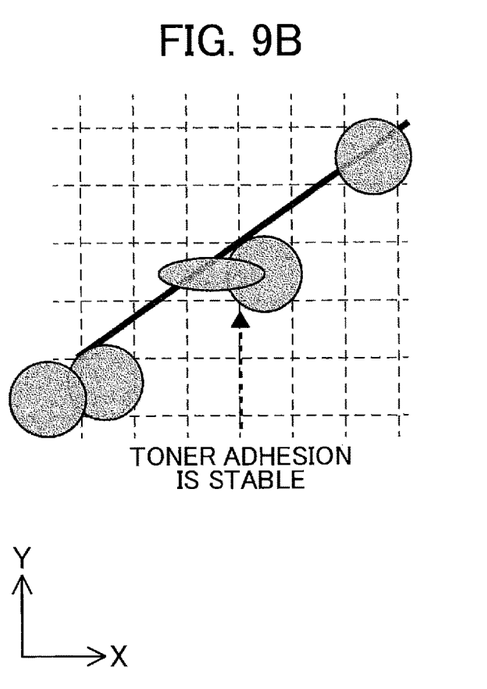

The pattern in FIG. 9A shows a comparative example of the general dither pattern corresponding to the dither pattern at the growth stage 2. In FIG. 9A beam spots are based on the patterns which are grown so that the pixel of the exposure area is at the right sides of the isolated pixel. Since the diameter of the exposure beam near the center is elongated in the Y-direction, this exposure beam does not overlap the adjacent exposure beam spot and, hence, toner is unlikely to adhere in this area. Therefore, the amount of toner deposition is reduced in this area. This can readily lead to the generation of a white streak, i.e., a streak extends in the Y-direction where toner deposition is low. On the other hand, when the diameter of the exposure beam near the center is elongated in the X-direction, as illustrated in FIG. 9B, the exposure beam overlaps the neighboring exposure beam spot, resulting in stable toner adhesion. Hence, a white streak is not generated in this area.

Figure 9C:
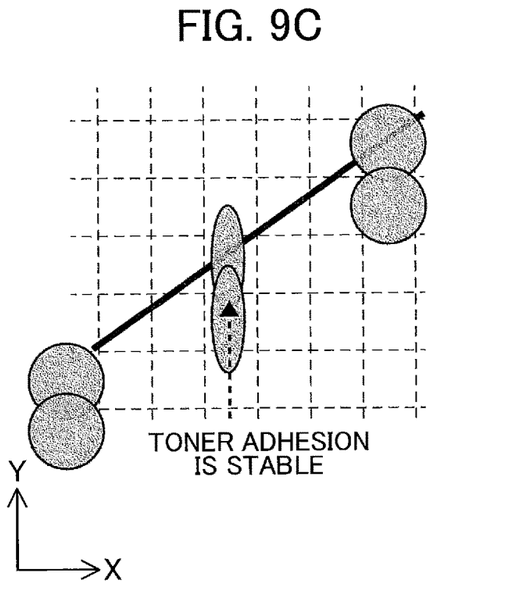
Figure 9D:
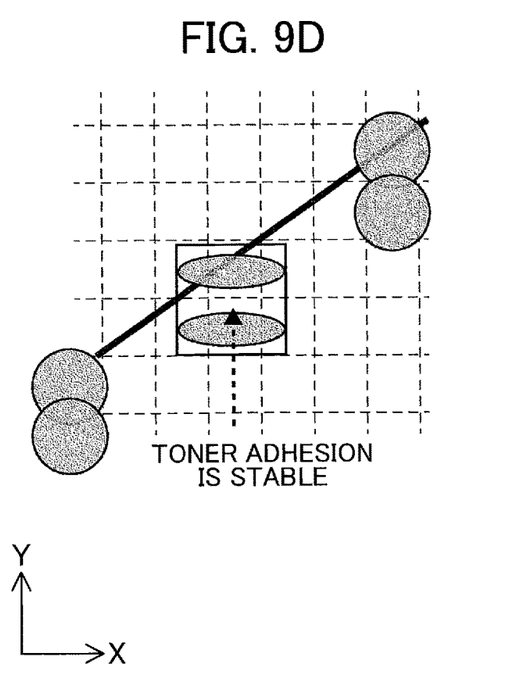

FIG. 9C shows beam spots based on a pattern corresponding to the growth stage 2 in the dither pattern of the present embodiment in which the pattern grows so that the pixel as the exposure area is formed on the bottom of the isolated pixel (original pixel "1"). Since the diameter of the exposure beam near the center is elongated in the Y-direction, the amount of overlap between this beam spot and the neighboring exposure beam spot is increased, producing stable toner adhesion. Accordingly, a white streak is not generated in this area. On the other hand, even when exposure beam near the center is elongated in the X-direction, as illustrated in FIG. 9D, exposure between the two pixels overlaps since they are exposed for an exposure time $\Delta t$ and, hence, toner adhesion is stable. Therefore, a white streak is not generated in this area.

Note that the occurrence of white streaks is more pronounced when the screen angle of the dither pattern is small. Therefore, the dither matrix for suppressing white streaks in the present embodiment may be used only when the target screen angle is less than a prescribed angle.

The examples of the dither matrix shown in FIGS. 6A and 8B. However, the dither matrix may limited thereto. The size or shape of the dither matrix may be changed. Further, provided that the features of the development process of the dither pattern is the same as that shown in FIGS. 6B and 8B, threshold values, which defines the growth order of the dither pattern, may be arbitrarily set.

Implementation Through Software

The functional blocks of the image forming device 1 (and particularly the controller 101) may be implemented by logic circuits (hardware) formed on an integrated circuit (a microchip) or the like or may be implemented through software.

In the latter case, the image forming device 1 includes a computer to execute program instructions which are software to implement each function. The computer may include one or more processors and a computer-readable storage medium storing the program instructions. The subject of the present disclosure can be achieved by reading the program from the storage medium and executing the read program by the processors.

A central processing unit (CPU) may be used as the processor, for example. The storage medium may be a non-transitory tangible storage medium such as a ROM, a tape, a disc, a card, a semiconductor memory, or a programmable logic circuit. Random-access memory (RAM) may also be provided for developing the program. The program may also be supplied to the computer described above via any transmission medium (a communication network, broadcast waves, etc.) capable of transmitting the program. Note that one aspect of this specification is that the program can be implemented in the form of data signals embedded in a carrier wave, as embodied in electronic transmission.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image forming device, comprising:
   a photosensitive drum;
   an exposure device configured to expose the photosensitive drum to light to form an electrostatic latent image thereon;
   a developing member configured to develop the electrostatic latent image on the photosensitive drum; and
   a controller configured to convert continuous-tone image data to raster image data using a dither matrix, the continuous-tone image data including pixels each having a tone value, the raster image data being binary image data corresponding to exposure areas, the dither matrix including threshold values for converting the continuous-tone image data to the raster image data, wherein the dither matrix is configured so that as an exposure area percentage of the raster image data increases, growth of the exposure area progresses according to a growth process including:
- a stage at which an exposure area extends in a predetermined screen direction from an isolated exposure area to connect with another isolated exposure area; and
- a stage at which after the isolated exposure area connects with the another isolated exposure area, the exposure area extends in a crossing direction crossing the predetermined screen direction, wherein the controller is configured to control the exposure device to expose the photosensitive drum based on the raster image data.

2. The image forming device according to claim 1, wherein the growth process further includes:
- a stage at which before the isolated exposure area connects with the another isolated exposure area, the exposure area extends in a sub scanning direction from the isolated exposure area, the sub scanning direction being orthogonal to a main scanning direction parallel to a rotation axis of the photosensitive drum.

3. The image forming device according to claim 1, wherein the growth process further includes:
- a stage at which after the isolated exposure area connects with the another isolated exposure area, the exposure area extends in a sub scanning direction orthogonal to a main scanning direction parallel to a rotation axis of the photosensitive drum.

4. The image forming device according to claim 1, wherein the growth process further includes:
- a stage at which the exposure area extends in a sub scanning direction from the isolated exposure area and connects with the another isolated exposure area adjacent to the isolated exposure area in the sub scanning direction when the exposure area percentage of the raster image data is larger than or equal to a predetermined percentage, the sub scanning direction being orthogonal to a main scanning direction parallel to a rotation axis of the photosensitive drum.

5. The image forming device according to claim 4, wherein the predetermined percentage is 60%.

6. The image forming device according to claim 1, wherein the crossing direction crosses the predetermined screen direction at an angle of 90 degrees.

7. The image forming device according to claim 1, wherein the exposure device includes:
- a plurality of light emitting elements arranged in a main scanning direction parallel to a rotation axis of the photosensitive drum; and
- a lens array to form the electrostatic latent image on the photosensitive drum with light emitted from the plurality of light emitting elements, wherein the lens array is arranged in a single line extending in the main scanning direction.

8. A method for generating raster image data from continuous-tone image data using a dither matrix, the continuous-tone image data including pixels each has a tone value, the raster image data being binary image data corresponding to exposure areas, the dither matrix including threshold values for converting the continuous-tone image data to the raster image data, the method comprising:
- configuring the dither matrix so that as an exposure area percentage of the raster image data increases, growth of the exposure area progresses according to a growth process including:
  - a stage at which an exposure area extends in a predetermined screen direction from an isolated exposure area to connect with another isolated exposure area; and
  - a stage at which after the isolated exposure area connects with the another isolated exposure area, the exposure area extends in a crossing direction crossing the predetermined screen direction;
- converting the continuous-tone image data to the raster image data using the configured dither matrix; and
- controlling an exposure device to expose a photosensitive drum based on the raster image data.

9. The method according to claim 8, wherein the growth process further includes:
- a stage at which before the isolated exposure area connects with the another isolated exposure area, the exposure area extends in a sub scanning direction from the isolated exposure area, the sub scanning direction being orthogonal to a main scanning direction parallel to a rotation axis of the photosensitive drum.

10. The method according to claim 8, wherein the growth process further includes:
- a stage at which after the isolated exposure area connects with the another isolated exposure area, the exposure area extends in a sub scanning direction orthogonal to a main scanning direction parallel to a rotation axis of the photosensitive drum.

11. The method according to claim 8, wherein the growth process further includes:
- a stage at which the exposure area extends in a sub scanning direction from the isolated exposure area and connects with the another isolated exposure area adjacent to the isolated exposure area in the sub scanning direction when the exposure area percentage of the raster image data is larger than or equal to a predetermined percentage, the sub scanning direction being orthogonal to a main scanning direction parallel to a rotation axis of the photosensitive drum.

12. The method according to claim 11, wherein the predetermined percentage is 60%.

13. The method according to claim 8, wherein the crossing direction crosses the predetermined screen direction at an angle of 90 degrees.

* * * * *